United States Patent [19]

Kizaki

[11] Patent Number: 4,846,999

[45] Date of Patent: Jul. 11, 1989

[54] LIQUID CRYSTAL COMPOSITION

[75] Inventor: Seiichi Kizaki, Tokyo, Japan

[73] Assignee: Casio Computer Co., Ltd., Tokyo, Japan

[21] Appl. No.: 106,015

[22] Filed: Oct. 1, 1987

Related U.S. Application Data

[63] Continuation of Ser. No. 752,410, Jul. 5, 1985, abandoned.

[30] Foreign Application Priority Data

Jul. 9, 1984 [JP] Japan ................................ 59-141599

[51] Int. Cl.$^4$ ...................... C09K 19/30; C09K 19/12; C09K 19/20; C09K 19/54
[52] U.S. Cl. ............................ 252/299.63; 252/299.5; 252/299.66; 252/299.67; 252/299.61; 350/350 R
[58] Field of Search ........... 252/299.5, 299.63, 299.66, 252/299.67; 350/350 R

[56] References Cited

U.S. PATENT DOCUMENTS

| 4,198,130 | 4/1980 | Boller et al. | 252/299.63 |
|---|---|---|---|
| 4,455,261 | 6/1984 | Sasoki et al. | 252/299.67 |
| 4,464,283 | 8/1984 | Hasegawa et al. | 252/299.63 |
| 4,469,618 | 9/1984 | Hasegawa et al. | 252/299.63 |
| 4,483,595 | 11/1984 | Irving et al. | 252/299.5 |
| 4,528,115 | 7/1985 | Ishii et al. | 252/299.63 |
| 4,550,980 | 11/1985 | Shingu | 252/299.63 |
| 4,551,280 | 12/1985 | Sasaki et al. | 252/299.5 |
| 4,622,162 | 11/1986 | Kimura et al. | 252/299.5 |
| 4,643,841 | 2/1987 | Ishii et al. | 252/299.5 |
| 4,722,804 | 2/1988 | Ishii et al. | 252/299.5 |
| 4,729,639 | 3/1988 | Hubbard | 252/299.5 |
| 4,737,312 | 4/1988 | Matsumoto et al. | 252/299.5 |
| 4,740,328 | 4/1988 | Fujimura | 252/299.63 |
| 4,759,870 | 7/1988 | Fujimura | 252/299.63 |

FOREIGN PATENT DOCUMENTS

| 178937 | 4/1986 | European Pat. Off. | 252/299.63 |
|---|---|---|---|
| 2802588 | 6/1979 | Fed. Rep. of Germany . | |
| 58-65781 | 4/1983 | Japan | 252/299.63 |
| 58-204081 | 11/1983 | Japan | 252/299.63 |
| 58-210982 | 12/1983 | Japan | 252/299.67 |
| 58-225179 | 12/1983 | Japan | 252/299.63 |
| 59-01586 | 1/1984 | Japan | 252/299.61 |
| 60-101183 | 6/1985 | Japan | 252/299.61 |
| 71-44991 | 3/1986 | Japan | 252/299.61 |
| 60-64785 | 4/1986 | Japan | 252/299.63 |
| 71-64786 | 4/1986 | Japan | 252/299.63 |
| 2080561 | 2/1982 | United Kingdom | 252/299.63 |

OTHER PUBLICATIONS

Patent Abstracts of Japan, vol. 9, No. 241 (C-306)(1964), Sep. 27, 1985; JP-A-60 101 183 (Hitachi Seisakusho, K.K.) 05-06-85.
Patent Abstracts of Japan, vol. 10, No. 139 (C-348) (2196), May 22, 1986; JP-A-61 291 (Canon K.K.) 06-01-86.
Patent Abstracts of Japan, vol. 10, No. 172 (C-354) (2228), Jun. 18, 1986; JP-A-61 21 186 (Suwa Seikosha K.K.) 29-01-86.
Molecular Crystals and Liquid Crystals & Letters, vol. 94, No. ½, 1983, pp. 119–125, Gordon and Breach Scienec Publishers, Inc.
R. Eidenschink: "Low Viscous Compounds of Highly Neumatic Character".

Primary Examiner—Teddy S. Gron
Assistant Examiner—J. E. Thomas
Attorney, Agent, or Firm—Frishauf, Holtz, Goodman & Woodward

[57] ABSTRACT

A liquid crystal composition includes three liquid crystal materials, each selected from specified liquid crystal compounds. The composition has a low threshold voltage and a low viscosity.

15 Claims, No Drawings

LIQUID CRYSTAL COMPOSITION

This application is a continuation of application Ser. No. 752,410, filed July 5, 1985, now abandoned.

BACKGROUND OF THE INVENTION

1. Field of the Invention

The present invention relates to a liquid crystal composition.

2. Description of the Prior Art

In conventional twisted nematic (TN) liquid crystal display devices used as display elements for electronic wristwatches or the like, liquid crystals including those having a high N-I (nematic-isotropic phase transition) point are mixed in nematic liquid crystals (Np liquid crystals) having a positive dielectric anisotropy ($\Delta\epsilon$) so as to increase the N-I point. Such small liquid crystal devices are required to operate at a low voltage so as to simplify voltage source circuits and prolong the life of a battery.

The voltage for driving the display device must be sufficiently higher than a threshold voltage Vth of the liquid crystal material used. The threshold voltage is defined as the voltage applied to the liquid crystal material to change the amount of light (transmitted from the liquid crystal material) to a predetermined extent (i.e., 50%), at which the change in the transmitted amount is distinguishable with respect to the amount of light transmitted from the liquid crystal material when no voltage is applied thereto. The value of the threshold voltage is inherent to the liquid crystal material used. In order to drive the display device at a low voltage, therefore, a liquid crystal composition having a low threshold voltage must be used.

Conventional liquid crystal compositions, however, have high threshold voltages. A conventional liquid crystal composition must be driven at a voltage of no less than about 1.5 V even when it is statically driven. When the liquid crystal composition is dynamically driven, a sufficiently higher voltage must be applied thereto. For example, when a dynamically driven liquid crystal display device is time-divisionally driven at a ½ duty, a common connection electrode is selected for every half of one-frame period and an effective voltage applied between the segment electrode and the common electrode is decreased. For this reason, in order to dynamically drive a liquid crystal display device which has a conventional liquid crystal composition, a high voltage of about 3 V must be applied in view of the decrease in the effective voltage value.

In short, a statically driven liquid crystal display device using the conventional liquid crystal composition is driven by a battery having an electromotive force of 1.5 V at least. However, a dynamically driven liquid crystal display device using the conventional composition must be driven by two batteries each having an electromotive force of 1.5 V or a large battery having an electromotive force of 3 V. As a result, the liquid crystal display device becomes large in size as a whole. The conventional dynamically driven liquid crystal display device can be driven by one battery having an electromotive force of 1.5 V when the battery voltage is boosted. For this purpose, however, a booster complicates the arrangement of the driving circuit of the liquid crystal display device.

Furthermore, a threshold voltage and a viscosity of a conventional liquid crystal composition vary greatly in accordance with a change in temperature. At low temperatures, the threshold voltage is high and the composition cannot than be sufficiently driven at such temperatures, thereby degrading display contrast. Under the same conditions, the viscosity of the composition is increased to prolong the response time. As a result, conventional liquid crystal compositions can be used only within a narrow operation temperature range.

SUMMARY OF THE INVENTION

It is, therefore, an object of the present invention to provide a liquid crystal composition which has a low threshold voltage Vth and has a wide operation temperature range.

In order to achieve the above object of the present invention, there is provided a liquid crystal composition comprising:

at least one first liquid crystal material selected from the group consisting of liquid crystal compounds represented by general formulas

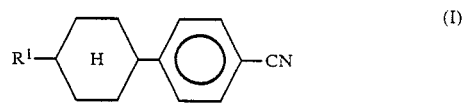

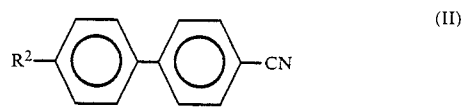

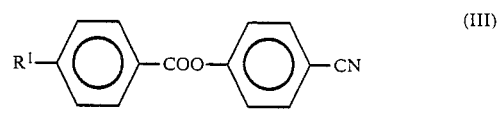

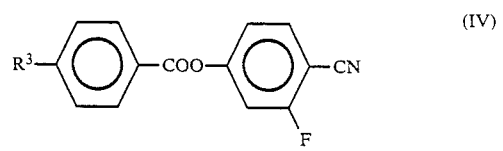

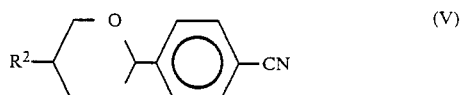

(wherein each $R^1$ is independently ethyl group, propyl group or butyl group, each $R^2$ is independently ethyl group, propyl group or pentyl group, and $R^3$ is ethyl group or propyl group);

at least one second liquid crystal material selected from the group consisting of liquid crystal compounds represented by general formulas

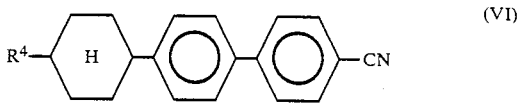

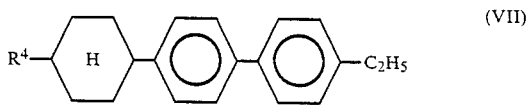

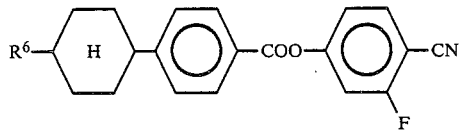
(VIII)

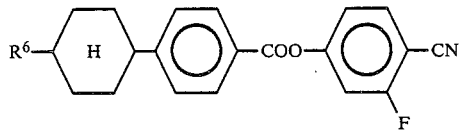
(IX)

(wherein each $R^4$ is independently propyl group or pentyl group, $R^5$ is ethyl group or pentyl group, and $R^6$ is propyl group or butyl group); and at least one third liquid crystal material selected from the group consisting of a liquid crystal compounds represented by general formulas

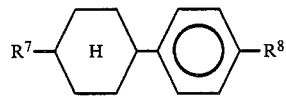
(X)

(XI)

(wherein each $R^7$ is independently propyl group or pentyl group, $R^8$ is ethyl group or propyl group, and $R^9$ is methyl group, ethyl group, or butyl group).

In general, the first to third liquid crystal materials are used in the amounts of 5 to 70% by weight, 15 to 40% by weight and 5 to 30% by weight, respectively, based on the total weight of the liquid crystal composition.

DETAILED DESCRIPTION OF THE PREFERRED EMBODIMENTS

The present inventors made extensive studies to find a liquid crystal composition which has a low threshold voltage Vth and can therefore be dynamically driven at a low application voltage, but which has a wide operation temperature range. The present inventors found that the prescribed object could be achieved by combining a specific liquid crystal compound which lowers the threshold voltage, another specific liquid crystal compound which maintains a liquid crystal phase even at a high temperature, and still another liquid crystal compound whose viscosity is low and which does not increase the threshold voltage.

The liquid crystal composition of the present invention comprises three liquid crystal materials as described above.

The first liquid crystal material is selected from the group consisting of liquid crystal compounds represented by general formulas

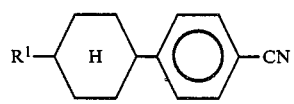
(I)

(II)

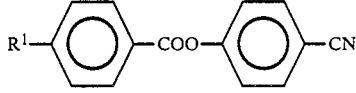
(III)

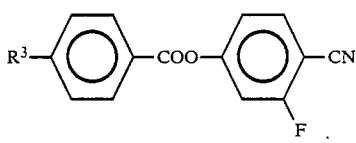
(IV)

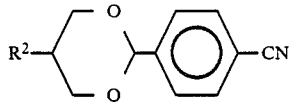
(V)

(wherein each $R^1$ is independently ethyl group, propyl group or butyl group, each $R^2$ is independently ethyl group, propyl group or pentyl group, and $R^3$ is ethyl group or propyl group). A mixture of two or more of these liquid crystal compounds can be used.

The first liquid crystal material has a very large positive dielectric anisotropy $\Delta\epsilon$ (e.g., +10 or more) and decreases the threshold voltage Vth of the resultant liquid crystal composition. In particular, the compound represented by general formula (IV) has a positive dielectric anisotropy $\Delta\epsilon$ of +20 or more (however, viscosity is high).

The second liquid crystal material is selected from the group consisting of liquid crystal compounds represented by general formulas

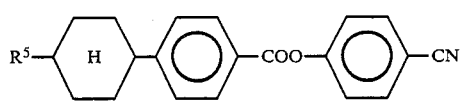
(VI)

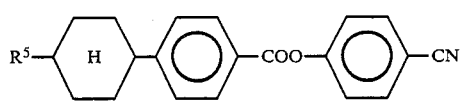
(VII)

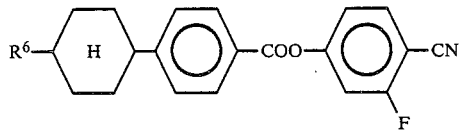
(VIII)

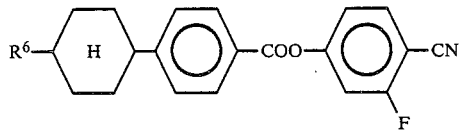
(IX)

(wherein each $R^4$ is independently propyl group or pentyl group, $R^5$ is ethyl group or pentyl group, and $R^6$ is propyl group or butyl group). A mixture of two or more of these liquid crystal compounds can be used.

The second liquid crystal material is a high-temperature liquid crystal having a high N-I point and can maintain the liquid crystal phase up to a high temperature of 160° C. or more. In general, a liquid crystal having a high N-I point has a high viscosity. However, the second liquid crystal material used in the present invention has a relatively low viscosity (e.g., 90 cP or less at 20° C.). In particular, the compound represented by general formula (VII) has a viscosity of 20 cP at 20° C. The compound represented by general formula (IX) has a large positive dielectric anisotropy $\Delta\epsilon$ ($\Delta\epsilon = +20$), and therefore, the threshold voltage Vth of the resultant liquid crystal composition containing this compound can be decreased.

The third liquid crystal material used in the present invention is selected from the group consisting of liquid crystal compounds represented by general formulas

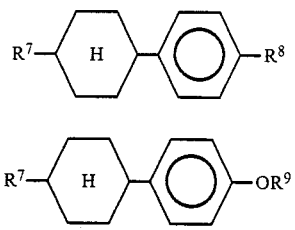

(wherein each $R^7$ is independently propyl group or pentyl group, $R^8$ is ethyl group or propyl group, and $R^9$ is methyl group, ethyl group, or butyl group). A mixture of two or more of these compounds can be used.

The third liquid crystal material has a very low viscosity (10 cP or less at 20° C.) and a positive dielectric anisotropy $\Delta\epsilon$ close to zero. Therefore, the third liquid crystal material serves to decrease the viscosity of the resultant composition without increasing the threshold voltage very much. The third liquid crystal material guarantees the operation of the liquid crystal composition at a low temperature. It should be noted that $R^1$ to $R^9$ in general formulas (I) to (IX) preferably have normal structures.

The liquid crystal composition of the present invention comprises the first, second and third liquid crystal materials as noted above. The mixing ratio of these liquid crystal materials is preferably as follows.

The first liquid crystal material is used in the amount of 5 to 70% by weight, preferably 40 to 55% by weight, based on the total weight of the first, second and third liquid crystal materials. When liquid crystal compounds represented by formula (I) and/or formula (II) are used, the mixing ratio more preferably falls within the range of 10 to 30% by weight. When a liquid crystal compound represented by general formula (III) is used, the mixing ratio more preferably falls within the range of 5 to 30% by weight. When liquid crystal compounds represented by general formula (IV) and/or general formula (V) are used, the mixing ratio more preferably falls within the range of 5 to 40% by weight.

The second liquid crystal material is used in the amount of 15 to 40% by weight based on the total weight of the first, second and third liquid crystal materials. The second liquid crystal material is preferably used in the amount of 25 to 35% by weight.

The third liquid crystal material is used in the amount of 5 to 30% by weight based on the total weight of the first, second and third liquid crystal materials. The third liquid crystal material is preferably used in the amount of 15 to 25% by weight.

The liquid crystal composition having a combination of three specific liquid crystal materials has a low threshold voltage Vth (the composition can be dynamically driven at an application voltage of about 1.5 V) and has a low viscosity (40 cP or less at 20° C.). In addition, the threshold voltage Vth and the viscosity are only slightly changed in accordance with changes in ambient temperature, so that the composition has a wide operation temperature range. Furthermore, the liquid crystal composition of the present invention has an N-I point of 55° C. or more and a C-N point (crystal-nematic phase transition) point of 0° C. or less.

The present invention will be described in detail by way of examples.

EXAMPLE

Three groups of liquid crystal compounds were mixed in the amounts (% by weight) as given in the table below. Threshold voltages Vth at 25° C., N-I points, C-N points, and viscosities (cP; centipoise) at 20° C. of the resultant liquid crystal compositions were measured. The results are shown in the table.

Incidentally, the respective liquid crystal compounds were measured in % by weight as given in the table and poured into a glass container. After the container was evacuated and nitrogen gas was introduced, the container was sealed, thereby obtaining a nitrogen atmosphere. The glass container was dipped in an oil bath at a temperature of 80° C., thereby heating and convecting the liquid crystal compounds in the glass container, thus mixing the compounds.

TABLE

| Liquid crystal compound | Example 1 | Example 2 | Example 3 | Example 4 | Example 5 |
|---|---|---|---|---|---|
| First liquid crystal material  $C_2H_5$—⬡H—⬠—CN | — | 5 | — | — | — |
| $C_3H_7$—⬡H—⬠—CN | 17 | 10 | — | 18 | 18 |
| $C_2H_5$—⬠—⬠—CN | — | — | 15 | — | — |

TABLE-continued

| Liquid crystal compound | | Example 1 | Example 2 | Example 3 | Example 4 | Example 5 |
|---|---|---|---|---|---|---|
| | $C_2H_5$—⟨⟩—COO—⟨⟩—CN | 13 | 15 | 15 | 14 | 14 |
| | $C_2H_5$—⟨⟩—COO—⟨⟩(F)—CN | 6 | 8 | 9 | 9 | 9 |
| | $C_3H_7$—⟨⟩—COO—⟨⟩(F)—CN | 8 | 10 | 9 | 9 | 9 |
| Second liquid crystal material | $C_5H_{11}$—H—⟨⟩—⟨⟩—CN | — | 7 | 8 | — | 4 |
| | $C_5H_{11}$—H—⟨⟩—COO—⟨⟩—CN | 5 | — | — | 4 | — |
| | $C_3H_7$—H—⟨⟩—COO—⟨⟩(F)—CN | 8 | 10 | 7 | 9 | 9 |
| | $C_5H_{11}$—H—⟨⟩—⟨⟩—$C_2H_5$ | 19 | — | 18 | 16 | 16 |
| | $C_3H_7$—H—⟨⟩—⟨⟩—$C_2H_5$ | — | 15 | — | — | — |
| Third liquid crystal material | $C_3H_7$—H—⟨⟩—$C_2H_5$ | 6 | — | — | 10 | 10 |
| | $C_5H_{11}$—H—⟨⟩—$C_3H_7$ | — | 10 | 7 | — | — |
| | $C_3H_7$—H—⟨⟩—$OC_2H_5$ | 18 | 10 | 12 | 11 | 11 |
| Physical properties | Vth at 25° C. (Volt) | 1.27 | 1.15 | 1.10 | 1.12 | 1.14 |
| | N-1 point (°C.) | 66.1 | 60.5 | 61.2 | 60 | 59.5 |
| | C-N point (°C.) | 0° C. or lower | 0° C. or lower | 0° C. or lower | 0° C. or lower | 0° C. or lower |
| | Viscosity at 20° C. | 27 | 32 | 35 | 29 | 27 |

TABLE-continued

| Liquid crystal compound | Example 1 | Example 2 | Example 3 | Example 4 | Example 5 |
|---|---|---|---|---|---|
| (cP) | | | | | |

As is apparent from the above table, the liquid crystal compositions of Examples 1 to 5 have low threshold voltage Vth of 1.10 V to 1.27 V. These compositions can be time-divisionally driven at a low application voltage of about 1.5 V. The compositions have high N-I points of 59.5° C. to 66.1° C. and low C-N points of 0° C. or lower. At the same time, the viscosities of the resultant compositions are low, so that they have a wide operation temperature range. Therefore, the liquid crystal compositions of Examples 1 to 5 can be driven at a high response speed without degrading display contrast.

Even if an optically active material such as a chiral nematic liquid crystal is added to the liquid crystal compositions of the present invention, the characteristics of the compositions will not change. The liquid crystal compositions of the present invention have a positive dielectric anisotropy and are mainly used in TN liquid crystal display devices. Even if a dichroic dye is added to the liquid crystal compositions of the present invention, the characteristics of the compositions will not change, so that they can also be used for GH (guest-host) liquid crystal display devices.

The liquid crystal composition according to the present invention is sealed between a pair of electrodes at least one of which is transparent. A drive voltage is applied between the pair of electrodes to perform various display modes.

What is claimed is:

1. A liquid crystal composition comprising from 20–70% of a first liquid crystal material, from 15–40% of a second liquid crystal material and from 5–30% of a third liquid crystal material;
    said first liquid crystal material consisting essentially of at least one compound of the formula I in an amount of 10–30%, at last one compound of the formula III in an amount of 5–30%, and at least one compound of the formula IV in an amount of 5–40%; and said first liquid crystal material may also contain at least on compound of the formula II, the amount of said at least one compound of the formula II plus said at least one compound of the formula I being from 10–30%;
    said second liquid crystal material consisting essentially of at least one compound of the formula VII and at least one compound of the formula IX; and said second liquid crystal material may also contain at least one compound of the formula VI and at least one compound of the formula VIII;
    said third liquid crystal material consisting essentially of at least one compound of the formula X and at least one compound of the formula XI;
    all percentages are by weight based on the total weight of said liquid crystal composition; and said compounds of said formulas being

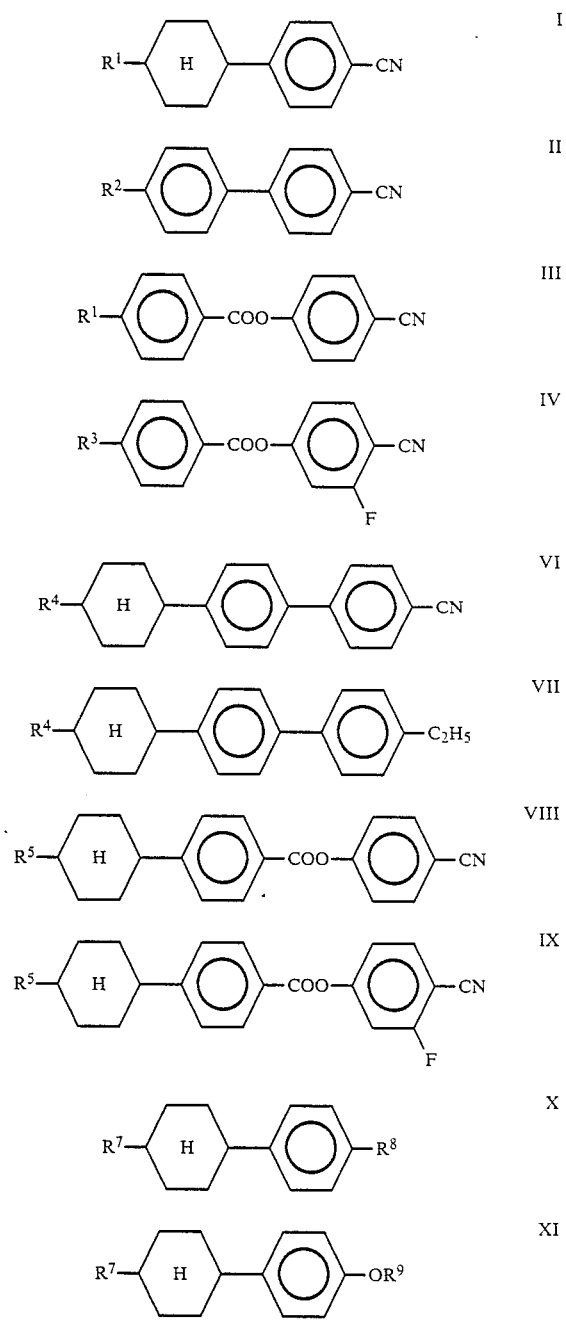

wherein each $R^1$ is ethyl, propyl or butyl, $R^2$ is ethyl, propyl or pentyl, and $R^3$ is ethyl group or propyl group, and $R^4$ is propyl, or pentyl, $R^5$ is ethyl or pentyl, $R^6$ is propyl or butyl, $R^7$ is propyl or pentyl, $R^8$ is ethyl or propyl, and $R^9$ is methyl, ethyl or butyl.

2. The composition of claim 1, wherein said first, second and third liquid crystal materials are in amounts of 40 to 55% by weight, 25 to 35% by weight, and 15 to 25% by weight, respectively.

3. The composition of claim 1, wherein said composition has a threshold voltage of not more than about 1.5 V.

4. The composition of claim 1, wherein said composition has a nematic-isotropic phase transition point of not lower than 55° C.

5. The composition of claim 2, wherein said composition has a crystal-nematic phase transition point of not higher than 0° C.

6. The composition of claim 2, wherein said composition has a threshold voltage of not more than about 1.5 V.

7. The composition of claim 6, wherein said composition has a viscosity of not more than 40 centipoises at 20° C.

8. The composition of claim 1, wherein said second liquid crystal material contains at least one compound of the formula VI in an amount of 4–8% or at least one compound of the formula VIII in an amount of 4–5%.

9. The composition of claim 8, wherein said second liquid crystal material, said at least one compound of the formula VII is in an amount of 15–19% and said at least one compound of the formula IX is in an amount of 7–10%, and when said second liquid crystal material contains said at least one compound of the formula VI, it is in an amount of 4–8% and when it contains said at least one compound of the formula VIII, it is in an amount of 4–5%; and in said third liquid crystal material, said at least one compound of the formula X is in an amount of 6–10% and said at least one compound of the formula XI is in an amount of 10–18%.

10. The composition of claim 8, wherein each $R^1$ is ethyl or propyl; $R^2$ is ethyl; $R^4$ is propyl or pentyl; $R^5$ is pentyl; $R^6$ is propyl and $R^7$ is propyl or pentyl.

11. The composition of claim 1, wherein each $R^1$ is ethyl or propyl; $R^2$ is ethyl; $R^4$ is propyl or pentyl; $R^5$ is pentyl; $R^6$ is propyl and $R^7$ is propyl or pentyl.

12. The composition of claim 1, wherein said first liquid crystal material is from 40–70% by weight.

13. The composition of claim 1, wherein said first liquid crystal material is from 40–55% by weight.

14. The composition of claim 1, wherein in said first liquid crystal material, said at least one compound of the formula I is in an amount of 15–18%, said at least one compound of the formula III is in an amount of 13–15%, said at least one compound of the formula IV is in an amount of 14–18%; in said second liquid crystal material, said at least one compound of the formula VII is in an amount of 15–19% and said at least one compound of the formula IX is in an amount of 7–10%, and when said second liquid crystal material contains said at least one compound of the formula VI, it is in an amount of 4–8% and when it contains said at least one compound of the formula VIII, it is in an amount of 4–5%; and in said third liquid crystal material, said at least one compound of the formula X is in an amount of 6–10% and said at least one compound of the formula XI is in an amount of 10–18%.

15. The composition of claim 14, wherein each $R^1$ is ethyl or propyl; $R^2$ is ethyl; $R^4$ is propyl or pentyl; $R^5$ is pentyl; $R^6$ is propyl and $R^7$ is propyl or pentyl.

* * * * *